United States Patent [19]

Brown et al.

[11] Patent Number: 5,428,686
[45] Date of Patent: Jun. 27, 1995

[54] SECURE COMMUNICATION SYSTEM HAVING LONG-TERM KEYING VARIABLE

[75] Inventors: Carl D. Brown, Laurel; Robert T. Kearns, Silver Spring, both of Md.; Joseph A. Kersey, Arlington, Va.

[73] Assignee: The United States of America as represented by the Direrctor of the National Security Agency, Washington, D.C.

[21] Appl. No.: 306,062

[22] Filed: Sep. 28, 1981

[51] Int. Cl.6 .............................................. H04L 9/26
[52] U.S. Cl. ......................................... 380/46; 380/44
[58] Field of Search ............... 178/22.13, 22.15, 22.16, 178/22.17, 22.19; 375/2.1; 380/46, 44

[56] References Cited

U.S. PATENT DOCUMENTS

| | | | |
|---|---|---|---|
| 3,439,279 | 4/1969 | Guanella | 178/22.17 |
| 3,781,472 | 12/1973 | Goode et al. | 178/22.13 |
| 3,781,473 | 12/1973 | Goode et al. | 178/22.15 |
| 4,052,565 | 10/1977 | Baxter et al. | 375/2.1 |
| 4,200,770 | 4/1980 | Hellman et al. | 178/22.13 |
| 4,316,055 | 2/1982 | Feistel | 178/22.13 |

*Primary Examiner*—Salvatore Cangialosi
*Attorney, Agent, or Firm*—John R. Untermohle; Thomas O. Maser

[57] ABSTRACT

A secure communication apparatus incorporates a long-term, non-extractable master key variable which is held in common by all terminals. A pseudorandom bit sequence generator within the transmitter provides a binary bit stream which is transmitted unencrypted to the intended receiver. Both terminals simultaneously mix the master variable with the transmitted pseudorandom bit stream in an identical manner to create a common separate working variable which is subsequently used for data encryption and decryption.

15 Claims, 4 Drawing Sheets

SECURE COMMUNICATION SYSTEM HAVING LONG-TERM KEYING VARIABLE

BACKGROUND OF THE INVENTION

1. Field of the Invention

Our invention relates to the field of encrypted data communication, and particularly to remote keying by means of a commonly held, long term, nonextractable master variable.

2. Background of the Invention

Encrypted communications equipment has traditionally been used primarily for military and diplomatic communications. A major cause of this limited use was the relatively high costs involved in insuring the security of the equipment and the enciphering keys. Elaborate procedures were required to produce, transport, and store the keying materials prior to use, and also to insure the integrity of the personnel to whom the materials were entrusted. It also came about that a great diversity of equipments were designed and built, each capable of communicating information only to another equipment of identical design.

Modern electronic communications systems including enciphering capabilities are coming to be used with increasing frequency by non-governmental organizations for communication of important business information. There is an obvious need to protect information such as funds transfer requests, company proprietary information and business decisions from interception by unauthorized persons. Federal, state and local governments are also finding a need for encrypted communications for other than military purposes. As more and more organizations begin to need and use data encryption capability, it becomes increasingly desirable that such equipments be interoperable with the greatest possible number of other equipments. For the mutual benefit of all potential purchasers, it is further desirable that such equipment be made available at the lowest possible cost.

In order to insure a standard of protection for U.S. government non-military information, and in order to promote the availability of high-quality data communications protection to the public at a reasonable cost, the U.S. National Bureau of Standards has adopted a standardized data encryption algorithm. The algorithm has been published as Federal Standard 1026, which is available to the public through the Government Printing Office in Washington, D.C. as Federal Information in Processing Standard 46. One purpose of the Government in creating the Data Encryption Standard (DES) is to provide a highly secure and interoperable class of encryption equipment which may be produced by the private sector of the economy in numbers large enough to reduce costs and stimulate purchase by users who need such a capability.

A DES-based device has three modes of operation; electronic codebook, cipher-block-chaining, and cipher feedback. In the cipher feedback mode, the DES is a pseudorandom number generator whose output is used to encipher from 1 to 64 bits of plaintext for transmission. A frequently used embodiment of DES will produce an output of 64 key bits per cycle, 56 of which will not be used for encryption. The remaining eight bits will be modulo-2 added to eight bits of plaintext to create 8 bits of encrypted data. The encrypted data is transmitted and also fed back into the DES input to replace the eight bits oldest in time in the register. When two such devices are used to provide cryptographic protection to a communications link, at each end of the link the operator loads a common keying variable by whatever means provided (thumbwheel, keyboard, paper tape, etc.). At the commencement of transmission, the transmitting operator causes an initializing vector to be sent to the receiving unit. This initializing vector is also entered into the DES input of the transmitter unit as the starting information. This initializing vector serves two purposes: it synchronizes the two cryptographic devices and it assures that each transmission will commence at a new and unique point in the key cycle. Thus the published encryption process includes manual loading of the variable and the modification of that variable to some different, unique starting point.

It is readily apparent from the above that many traditional disadvantages associated with enciphering equipment are still present, such as the continuing need to produce, transport, and store the required common keying variables. Because the secrecy of the communication is dependent solely on the continued secrecy of the key variable, it remains essential that employees to whom the variable is entrusted be trustworthy. Elaborate measures must be taken to prevent theft of the variable at all stages of its existence. The security clearance and physical protection measures employed by the military are obviously beyond the financial and practical capabilities of most commercial concerns.

It is possible to eliminate some of the transportation and storage of keying variables by the incorporation of remote keying. U.S. Pat. No. 4,182,933 to Rosenblum describes a secure communication system in which keying materials are themselves transmitted in enciphered form to terminals between which it is desired to communicate private information. A major complexity of this apparatus comes from the need for a separate key distribution center for the purpose of establishing an initial connection between the two terminals. While the Rosenblum apparatus provides a high degree of security, it retains the deficiency of requiring encryption of data between the subscriber and the key distribution center by means of a key variable which was commonly held by each prior to the initiation of the communication.

SUMMARY OF THE INVENTION

Our invention provides a means with which two remotely located terminals may communicate encrypted information without either having previously received a commonly held working key variable or having established synchronism.

It is an object of our invention to provide an encoding apparatus, the security of which is not dependent upon the actions of the operator.

A further object is to provide within such an apparatus a long-term, non-extractable key.

A still further object is to provide a means for remote keying of a receiver.

It is also an object to provide remote keying utilizing transmission of only unencrypted synchronizing information.

Another object is to provide a unique starting point in the key cycle for each message.

Another object is to eliminate or substantially reduce producing, transporting, and storing of key materials.

Another object is to eliminate the need for a battery supply voltage to retain keying variables in the event of loss of power from the central supply source.

Another object is to eliminate the necessity for providing a means for manual insertion of a initialization vector into a key generator.

An apparatus having these and other desirable objects would include a receiver and a transmitter, each having an identical encryption device, and a means for providing a first binary word, or master variable, to the encryption device. A pseudorandom bit sequence is provided to the encryption device in the transmitter and is simultaneously transmitted to the encryption device in the receiver. Each encryption device mixes the first word (the master variable) and the pseudorandom sequence to provide a second binary word, or working variable, and then utilizes the second word to generate a key stream. In the transmitter, the key stream is mixed with a plain text binary data stream to provide a cipher stream which is sent to the receiver. The receiver mixes the cipher stream with the generated key stream to reproduce the original plain text data stream.

DESCRIPTION OF THE PREFERRED EMBODIMENT

Figure 1:
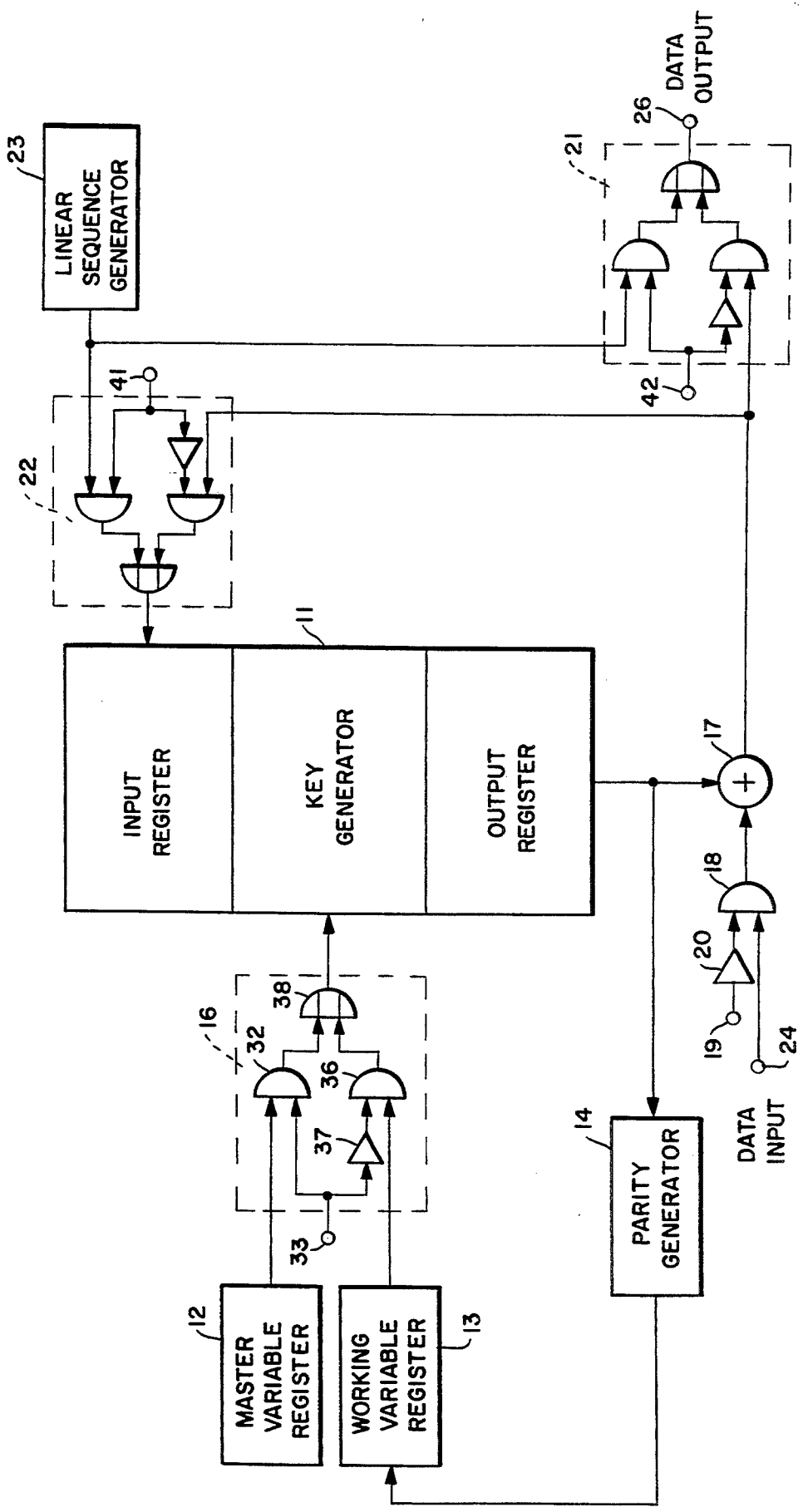
FIG. 1 is a block diagram of the transmitter portion of a secure communications system embodying our invention.
Figure 3:
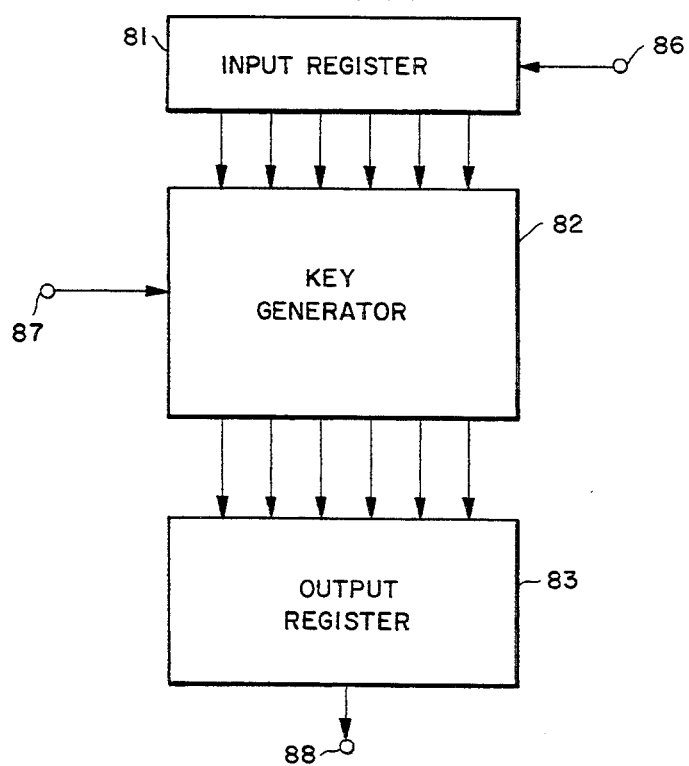
FIG. 3 is a block diagram of a known binary data encryptor suitable for use with our invention.

The transmitter portion of our invention, shown in FIG. 1, includes a data encryptor 11 such as is described more fully in connection with FIG. 3. A master variable register 2 and a working variable register 13 are each connected to the data encryptor through a switch 16. An output from encryptor 11 is fed to register 13 through a parity generator 14 and to a modulo-2 adder 17. A second input to adder 17 is provided by an AND gate 18, with the output of the adder being connected to a switch 21 and also to a switch 22. Gate 18 receives a first input from a control terminal 19 through an inverter 20, and a second input from a data input terminal 24. A linear sequence generator 23 provides a second input to switches 21 and 22. Switch 22 is connected to the data encryptor, while switch 21 connects to a transmission line at data output terminal 26.

Switch 16 includes a binary AND gate 32 having a first input from register 12 and a second input from control terminal 33. A second AND gate 36 receives an input from register 13 and a second input from terminal 33 through an inverter 37. The outputs of gates 32 and 36 are provided to the inputs of an OR gate 38. It is readily apparent that switch 16 is configured to allow information from register 12 to pass through the switch into data encryptor 11 only when the signal applied to terminal 33 is a binary "1", while simultaneously inhibiting the passage of information from register 13. Conversely, the presence of a binary "0" on terminal 33 inhibits the passage of information from register 12 while allowing information from register 13 to pass through switch 16 into the data encryptor. Switch 22 is configured in a manner identical to switch 16 to allow information from either sequence generator 23 or adder 17 to pass into data encryptor 11, depending on the state of the signal on control terminal 41. Switch 21 is similarly configured to pass information either from sequence generator 23 or adder 17 depending on the state of the signal on control terminal 42.

Figure 2:
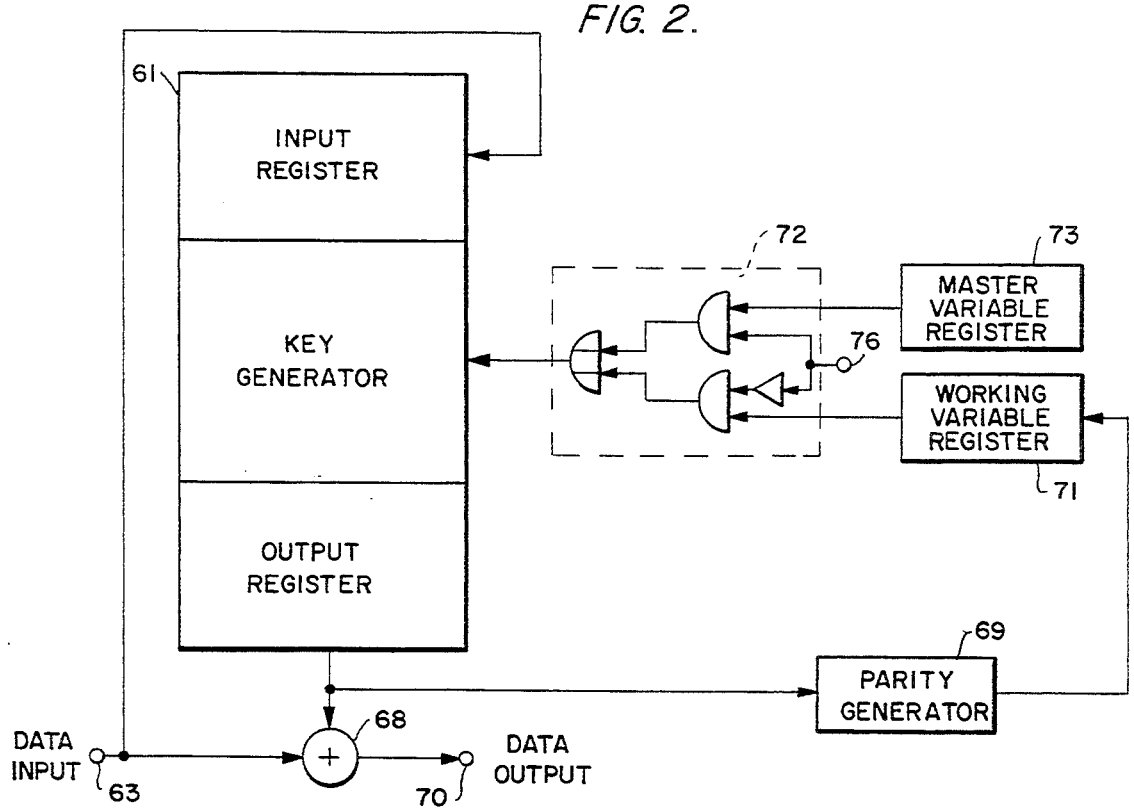
FIG. 2 is a block diagram of the receiver portion of a secure communications system embodying our invention.

The receiver portion of our invention is shown in FIG 2, and includes a data encryptor 61 identical to device 11 of FIG. 1. It has a 64-bit input register capable of receiving a serial bit stream from a transmission line connected to data input terminal 63 and a single output line which connects to a modulo-2 adder 68 and a parity generator 69. Data input terminal 63 provides a second input to adder 68. Parity generator 69 connects to a working variable register 71 and register 71 provides a first input to a switch 72. A second input is provided from a master variable register 73. Switch 72, which may be identical to switch 16 of FIG. 1, allows information from either master variable register 73 or working variable register 71 to pass through the switch into the key generator of encryptor 61, depending upon the state of the signal provided to control terminal 76.

FIG. 3 is a block diagram of the DES encryption device described in FIPS Publication 46, dated 15 Jan. 1977. It should be understood that we do not intend for our invention to be limited to use only with the DES encryptor; we intend only to suggest use of this device in a preferred embodiment. The encryptor 80 of FIG. 3 includes a 64-bit input register 81, a key generator 82, and a 64-bit output register 83. Information provided serially to input register 81 from terminal 86 is transferred in parallel into key generator 82. A keying variable may be transferred into key generator 82 through terminal 87. Key generator 82 mixes the data from input register 81 in a pseudorandom manner determined by the keying variable, and transfers 64 bits of resulting key in parallel into output register 83. Selected bits of data, from 1 to 64 bits, are then serially shifted out of register 83 to terminal 88 for use as key.

Master variable registers 12 (FIG. 1) and 73 (FIG. 2) will contain an identical binary word of substantial length, e.g., 56 or more bits. The precise number of bits in the master variable is somewhat arbitrary; however, the overall security of the system will increase as this word length is increased. The maximum advantages of our invention will be realized if registers 12 and 73 are filled with the master variable during fabrication, or at least prior to transfer of the device to the ultimate user, in such a manner that the variable may not thereafter be altered or read even upon destruction of the registers. An example of such a construction might be encasing of a read-only memory in a frangible epoxy casing such that both the casing and the register would be destroyed if any attempt were made to penetrate the casing.

A conventional means (not shown) must be provided to control the steps of operation. Initiation of a synchronizing procedure would likely be controlled by an operator at some appropriate time such as at the beginning of the work day, each time power is applied, or even at the beginning of each communication. The procedure might be initiated simply by depressing and holding a button for the necessary length of time. Upon procedure initiation, a "1" is applied to terminal 9, which prohibits any information from passing through AND gate 18. A "1" applied to terminal 33 opens gate 32 to allow the master variable to be transferred from master variable register 12 through switch 16 into the key generator of encryptor 1. The same signal on terminal 33 prohibits passage of information through gate 36 because of the presence of signal inverter 7. Immediately following transfer of the master variable into the key generator of encryptor 11, a "1" is applied to terminal 41 for the purpose of gating a pseudorandom bit sequence from linear sequence generator 23 through switch 22 into the input register. The "1" on terminal 41 simultaneously inhibits the passage of information from adder 17 through switch 22. The linear sequence generator 23 may be any conventional source of pseudorandom pulses. For example, it might be a multistage recirculating device such as is described in Peterson, W. Westley, *Error-Correcting Codes*, (New York: John Wiley & Sons, 1961), pp. 118–123.

After both the key generator and input register of encryptor 11 have been filled, the key generator is caused to step a large number of times to mix the master variable in a pseudorandom manner. A selected 64 bits of output from the key generator are first transferred into the output register, and then to parity generator 14. The parity generator receives the selected key bits and arranges them into bytes having proper parity. The DES cryptographic algorithm requires 8-bit bytes having odd parity, but it should be understood that the type of parity would depend on the particular algorithm implemented. Some means should be provided to insure that the key generator steps at least a minimum number of times to thoroughly mix the master variable. A timer could provide such a means. Additional randomization could be provided by allowing the key generator to continue stepping as long as the synchronize button is depressed by the operator.

The same operator-initiated synchronizing signal which causes the above procedure simultaneously causes a "1" to appear at terminal 42 to open switch 21 so that the output from linear sequence generator 23 passes to the data output terminal 26 as it is simultaneously gated into the input register of data encryptor 11. From terminal 26, the signal is transmitted by any conventional means to terminal 63 of the receiver (FIG. 2). The input register of data encryptor 61 of the receiver is filled by the received pseudorandom bit sequence, while at the same time a "1" is applied to terminal 76 and the master variable from register 73 is loaded into the key generator through switch 72. Master variable register 73 contains the identical master variable as was contained in register 12 of the transmitter. After both the key generator and the input register of encryptor 61 have been filled, the key generator is caused to step a large number of times to mix the master variable in a pseudorandom manner. A selected 64 bits of output from the key generator are first transferred into the output register and then into the working variable register 71.

It is readily apparent that the identical pseudorandom bit sequence which is gated from linear sequence generator 23 into the input register of data encryptor 11 is also inserted into the input register of data encryptor 61. Since each encryptor contains the same input register fill and the same master variable, it follows that each key generator will mix the master variable in an identical manner. The result is that both working variable register 13 and register 71 will contain the same working variable following the synchronization procedure. Anyone monitoring the transmission line would not be able to reconstruct the working variable from the data transmitted without knowledge of the master keying variable.

The end of the synchronization procedure is followed by a transmit procedure in which a plain text message is encrypted, transmitted and decrypted. During this procedure a "0" is provided to terminals 33, 19, 41 and 42. The contents of the working variable register 13 are gated through switch 16 into the key generator of encryptor 11. In the receiver, terminal 76 is provided a "0" input and the contents of the working variable in register 71 is loaded into the key generator of encryptor 61.

The apparatus is now configured to operate as a conventional cipher-text encrypt/decrypt system. A plain text data stream provided at terminal 24 passes through gate 18 to one input of adder 17 while data encryptor 11 is stepped to produce a key stream output which is provided to the second input of adder 17. The output from adder 17 is the cipher stream or encrypted message, which is gated through switch 21 to terminal 26 for transmission, and simultaneously through switch 22 into input register 27.

In the receiver, the enciphered message which is received at terminal 63 is provided both to one input of adder 68 and to the input register of encryptor 61. The key stream from encryptor 61 is provided to adder 68, the output of which is the original unenciphered plain-text data stream, at terminal 70.

Figure 4:
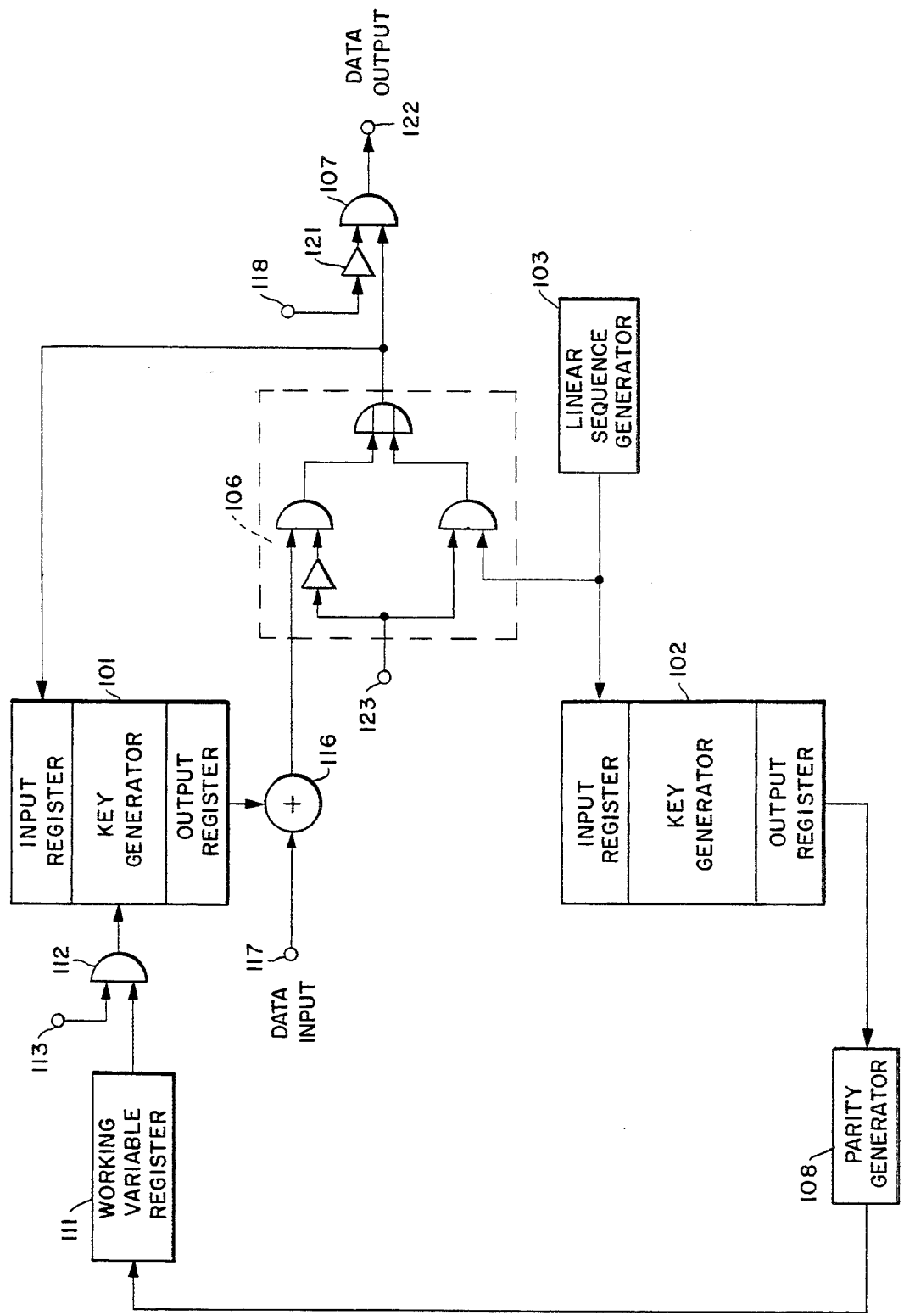
FIG. 4 is a block diagram of an alternative embodiment of the transmitter portion of FIG. 1.

FIG. 4 is an alternative embodiment of the transmitter portion of our invention. It includes a first data encryptor 101 and a second data encryptor 102. A linear sequence generator 103 provides a serial data stream to the input register of encryptor 102 and to one input of a switch 106. Switch 106 is connected to one input of an AND gate 107 and also to the input register of encryptor 101. The output register of data encryptor 102 is connected to a parity generator 108, which is coupled to a working variable register 111. A first input of an AND gate 112 receives data from register 111 and supplies data to the key generator of encryptor 101. A second input to AND gate 112 is provided by terminal 113. A modulo-2 adder 116 has a first input from a data input terminal 117 and a second input from the output register of data encryptor 101. The output of adder 116 is attached to the second input of switch 106. A second input to AND gate 107 is provided from terminal 118 through an inverter 121, and the output of AND gate 107 connects to a data output terminal 122. Switch 106 is controlled by signals applied to terminal 123. A source of timing information (not shown) may be constructed in any number of ways well known in the art to control the flow of information through the transmitter.

Figure 5:
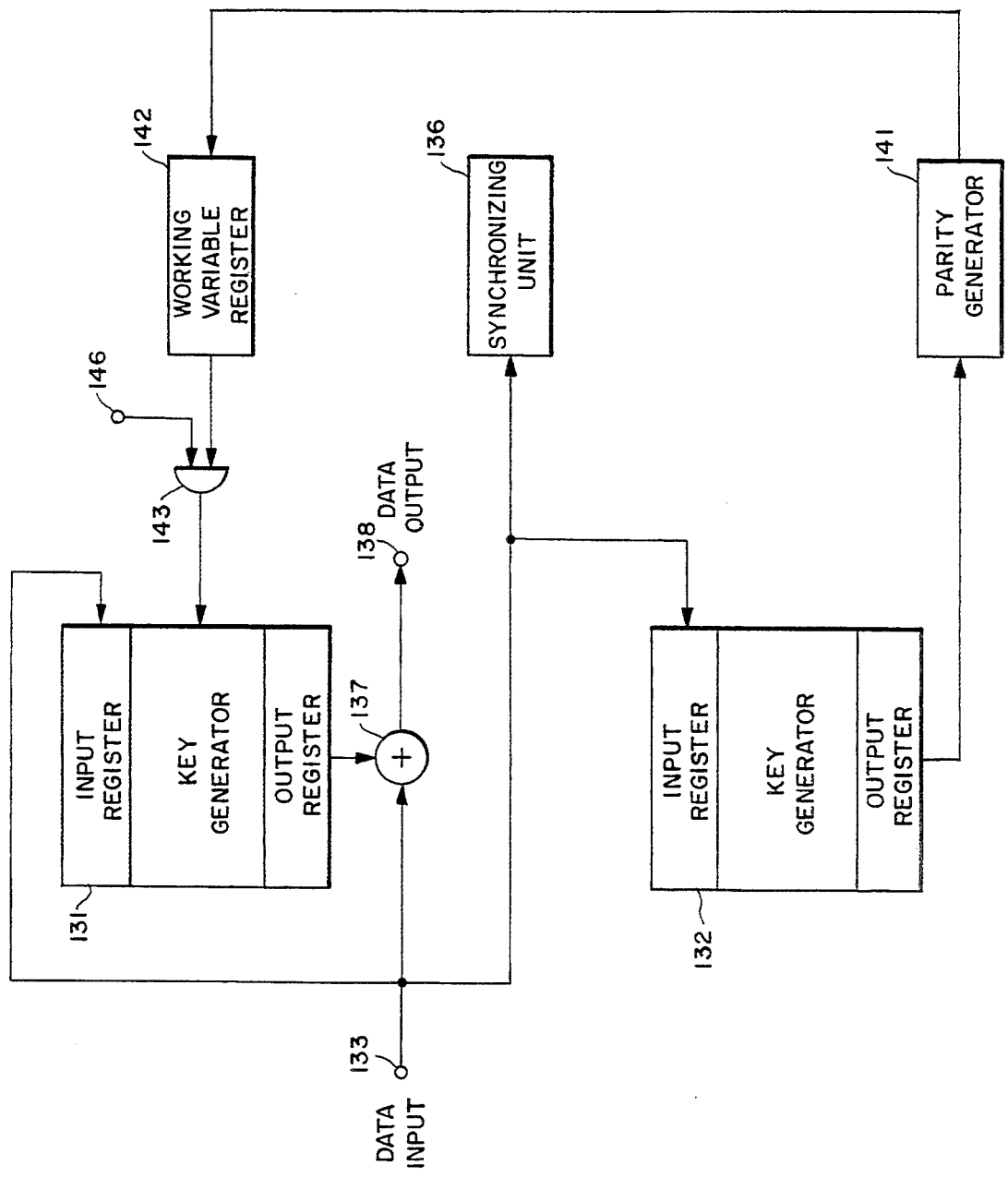
FIG. 5 is a block diagram of an alternative embodiment of the receiver portion of FIG. 2.

FIG. 5 is an alternative embodiment of the receiver portion of our invention. It includes first and second data encryptors 131 and 132, each of which has an input register, an output register, and a key generator. Data received on data input terminal 133 is provided to the input registers of encryptors 131 and 132, to a synchronizing unit 136, and to a modulo-2 adder 137. A second input to adder 137 is provided by the output register of encryptor 131, and the output of adder 137 is connected to a data output terminal 138. A parity generator 141 receives data from the output register of encryptor 132 and supplies data to a working variable register 142. The output of register 142 connects to an AND gate 143, which is connected to the key generator of data encryptor 131. Syncrhonizing unit 136 provides control information to terminal 146.

Data provided to terminal 122 of the transmitter is communicated to terminal 133 of the receiver by any conventional means. As was the case with the first embodiment, passage of encrypted data between the embodiments of FIGS. 4 and 5 is possible only when both possess a common master keying variable. In this case, the master variable may be permanently installed in the key generators of data encryptors 102 and 132 at the time of manufacture. They should be installed such that the variables may not thereafter be altered or read, even upon destruction of the encryptor and included registers.

The transmitter of FIG. 4 will have a synchronizing unit (not shown) of conventional design, the function of which is to supply necessary timing signals to appropriate gates to control the flow of data through the apparatus. Linear sequence generator 103 should be configured to run continuously whenever power is applied to the transmitter. Pulses from generator 103 are continuously applied to the input register of encryptor 102. The key generator of encryptor 102 continuously mixes the data from the input register with the master keying variable and provides key bits to the output register. Parity generator 108 receives the selected key bits and arranges them into bytes having proper parity.

The working variable register 111 is continuously filled with the last bytes supplied from parity generator 108. If the working variable were 64 bits long, register 111 would thus contain the last 8 bytes supplied from the key generator.

Initiation of a synchronizing sequence would likely be controlled by an operator at some appropriate time such as at the beginning of the work day, each time power is applied, or at the beginning of each communication. The sequence might be initiated simply by depressing a pushbutton switch for the necessary length of time. Some means should be provided to insure that the key generator steps at least some minimum number of times. The synchronizing unit of the transmitter provides a binary "1" at terminal 123 and a "0" at terminal 118 to allow passage of data from linear sequence generator 103 to the data output terminal 122. The same pulses are simultaneously provided to the input registers of encryptors 101 and 102. During this cycle a sufficient number of random bits from generator 103 is provided to the input register of encryptor 102 to provide a totally new working key variable to register 111. The synchronizing unit of the transmitter then provides a binary "1" to terminal 118, which stops information from flowing through AND gate 122. A "1" on terminal 113 causes the new working variable to shift from register 111 into the key generator of encryptor 101 through AND gate 112.

The receiver (FIG. 5) operates in a slave mode to the transmitter, and all data at terminal 122 is transmitted to terminal 133. During the synchronization sequence, the output of linear sequence generator 103 is thus gated into the input register of encryptor 132 of the receiver at the same time it is provided to the input register of encryptor 102 of the transmitter. Since the key generators of encryptor 102 and 132 both contain an identical master keying variable, identical key will be provided to parity generators 108 and 141 and identical working variables will be held by registers 111 and 142.

When a binary "1" is applied to terminal 118 of the transmitter, the flow of data to terminal 133 is interrupted. This interruption may be sensed in the receiver by synchronizing unit 136, which supplies a "1" to terminal 146. The contents of working variable register 142 are then entered into the key generator of encryptor 131 as the new working variable. At this point the key generators of encryptors 101 and 131 contain an identical working variable which has been simultaneously but independently generated in the transmitter and the receiver.

The inhibit signal is next removed from terminal 118 in the transmitter, and data to be encrypted is provided at terminal 117. Adder 116 combines the data to be encrypted with key from the output register of encryptor 101, and the resulting encrypted data stream is routed through switch 106, and AND gate 107 to terminal 122 for transmission. The same encrypted data stream is continuously fed back into the input register of encryptor 101 to produce new key. Encrypted data received at terminal 133 of the receiver is routed to the input register of data encryptor 131 and also to adder 137. Data encryptor 131 generates a key stream identical to that produced in the transmitter, so the output of adder 137 will be the original unencrypted data stream.

While the foregoing description was limited to one-way communication between a single transmitter and receiver, it should be readily apparent that the return link of a two-way (full duplex) system could be automatically rekeyed and synchronized to a new working variable by having a remote receiver unit signal its own transmitter unit of the commencement of a rekeying cycle. A resynchronization method utilizing this approach is described in U.S. Pat. No. 4,172,963 to Belcher et al. The embodiments described above are intended to be representative of our invention, which is defined in the claims.

We claim:

1. A secure communications apparatus, comprising:
   a receiver, and
   a transmitter, comprising:
   means for providing a pseudorandom bit sequence and for simultaneously transmitting said sequence to the receiver;
   means for mixing a first binary word and the pseudorandom bit sequence to produce a second binary word;
   means for utilizing said second word to generate a key stream;
   means for providing a plain text data stream;
   means for combining the data stream with the key stream to provide a cipher stream; and
   means for transmitting the cipher stream to the receiver.

2. The apparatus of claim 1 wherein said mixing means is a data encryptor.

3. The apparatus of claim 2 further comprising means for selectively switching either the first binary word or the second binary word into the data encryptor.

4. The apparatus of claim 3 further comprising means for selectively switching either the pseudorandom sequence or the cipher stream into the data encryptor.

5. The apparatus of claim 1 wherein said mixing means is a first data encryptor and said utilizing means is a second data encryptor.

6. The apparatus of claim 5 wherein the first binary word is permanently stored within said first data encryptor.

7. The apparatus of claim 6 further comprising means for transferring said second binary word into said second data encryptor.

8. The apparatus of claim 7 further comprising means for selectively switching either the pseudorandom sequence or the cipher stream into the second data encryptor.

9. The apparatus of claim 4 or 8 further comprising means for selectively transmitting either the pseudorandom sequence or the cipher stream to the receiver.

10. A secure communications apparatus, comprising:
a transmitter, and
a receiver, comprising:
means for receiving a pseudorandom bit sequence from the transmitter;
means for mixing a first binary word and the pseudorandom sequence to provide a second binary word;
means for utilizing said second binary word to generate a key stream;
means for receiving a cipher stream from the transmitter; and
means for combining the key stream and the cipher stream to provide a plain text data stream.

11. The apparatus of claim 10 wherein said mixing means is a data encryptor.

12. The apparatus of claim 11 further comprising means for selectively switching either the first binary word or the second binary word into the data encryptor.

13. The apparatus of claim 10 wherein said mixing means is a first data encryptor and said utilizing means is a second data encryptor.

14. The apparatus of claim 13 wherein the first binary word is permanently stored within said first data encryptor.

15. The apparatus of claim 14 further comprising means for transferring said second binary word into said second data encryptor.

* * * * *